US011209796B2

(12) United States Patent
Wang et al.

(10) Patent No.: US 11,209,796 B2
(45) Date of Patent: *Dec. 28, 2021

(54) SURVEILLANCE SYSTEM WITH INTELLIGENT ROBOTIC SURVEILLANCE DEVICE

(71) Applicant: TURING VIDEO, San Mateo, CA (US)

(72) Inventors: Fang Wang, Redwood City, CA (US); Song Cao, San Mateo, CA (US)

(73) Assignee: Turing Video, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/889,737

(22) Filed: Jun. 1, 2020

(65) Prior Publication Data

US 2020/0293020 A1 Sep. 17, 2020

Related U.S. Application Data

(63) Continuation of application No. 15/971,437, filed on May 4, 2018, now Pat. No. 10,671,050.

(Continued)

(51) Int. Cl.
G05B 19/19 (2006.01)
G05B 19/406 (2006.01)
(Continued)

(52) U.S. Cl.
CPC ....... *G05B 19/406* (2013.01); *G06K 9/00288* (2013.01); *G06K 9/00664* (2013.01);
(Continued)

(58) Field of Classification Search
CPC ........ G05B 19/406; G05B 2219/40002; G05B 2219/45103; G06K 9/00664;
(Continued)

(56) References Cited

U.S. PATENT DOCUMENTS 7,227,893 B1* 6/2007 Srinivasa ........... G06K 9/00771
348/155
7,299,152 B1 11/2007 Moritz
(Continued)

OTHER PUBLICATIONS

Xinyu Wang et al. "Robust and Real-Time Deep Tracking via Multi-Scale Domain Adaptation", Computer Vision Jan. 2017 (Year: 2017).*

(Continued)

*Primary Examiner* — Philip P. Dang
(74) *Attorney, Agent, or Firm* — Sheppard Mullin Richter & Hampton LLP

(57) ABSTRACT

A surveillance system may comprise one or more computing devices and one or more robotic surveillance devices. The one or more computing devices may be configured to obtain video data captured by one or more cameras. The one or more computing devices may analyze the video data to determine whether there is any trigger event. In response to determining that there is a trigger event, the one or more computing device may determine an optimal robotic surveillance device among the one or more robotic surveillance devices based on the trigger event and provide an instruction to the optimal robotic surveillance device. The optimal robotic surveillance device may be configured to perform a responding action in response to receiving the instruction.

15 Claims, 6 Drawing Sheets

Related U.S. Application Data

(60) Provisional application No. 62/505,090, filed on May 11, 2017.

(51) Int. Cl.
  *G06K 9/00* (2006.01)
  *H04N 7/18* (2006.01)

(52) U.S. Cl.
  CPC ...... *G06K 9/00711* (2013.01); *G06K 9/00771* (2013.01); *H04N 7/181* (2013.01); *G05B 2219/40002* (2013.01); *G05B 2219/45103* (2013.01); *G06K 2009/00738* (2013.01); *Y10S 901/47* (2013.01)

(58) Field of Classification Search
  CPC ..... G06K 9/00711; G06K 2009/00738; G06K 9/00288; G06K 9/00771; H04N 7/181; Y10S 901/47
  See application file for complete search history.

(56) References Cited

U.S. PATENT DOCUMENTS

| | | | |
|---|---|---|---|
| 8,599,266 B2 * | 12/2013 | Trivedi | H04N 5/2259 348/169 |
| 9,044,543 B2 * | 6/2015 | Levien | B64C 39/024 |
| 9,412,278 B1 * | 8/2016 | Gong | G08G 5/0043 |
| 9,494,936 B2 | 11/2016 | Kerzner | |
| 9,537,954 B2 * | 1/2017 | Ranasinghe | G07C 5/08 |
| 9,582,895 B2 * | 2/2017 | Brown | G06T 7/246 |
| 9,609,288 B1 * | 3/2017 | Richman | H04N 7/185 |
| 9,672,707 B2 * | 6/2017 | Kerzner | G08B 13/19682 |
| 9,697,425 B2 * | 7/2017 | Saptharishi | G06K 9/00536 |
| 9,798,325 B2 * | 10/2017 | Levien | G05D 1/0011 |
| 9,910,436 B1 * | 3/2018 | Li | G05D 1/0297 |
| 10,019,000 B2 * | 7/2018 | Levien | G06Q 10/08 |
| 10,019,633 B2 * | 7/2018 | Chen | G06K 9/00771 |
| 10,088,841 B2 | 10/2018 | Kerzner | |
| 10,372,970 B2 * | 8/2019 | Wang | G06T 7/70 |
| 2004/0061781 A1 | 4/2004 | Fennell et al. | |
| 2006/0120609 A1 * | 6/2006 | Ivanov | G06K 9/6293 382/224 |
| 2007/0058040 A1 | 3/2007 | Zhang et al. | |
| 2008/0081958 A1 * | 4/2008 | Denison | A61N 1/3706 600/300 |
| 2008/0226129 A1 | 9/2008 | Kundu et al. | |
| 2010/0150403 A1 | 6/2010 | Cavallaro et al. | |
| 2012/0127316 A1 | 5/2012 | Kundu et al. | |
| 2012/0188377 A1 | 7/2012 | Kundu et al. | |
| 2012/0230629 A1 | 9/2012 | Hill et al. | |
| 2014/0118543 A1 * | 5/2014 | Kerbs | G08B 13/19604 348/143 |
| 2016/0266577 A1 * | 9/2016 | Kerzner | G08B 13/19697 |
| 2017/0052539 A1 | 2/2017 | Kerzner | |
| 2017/0098161 A1 | 4/2017 | Ellenbogen et al. | |
| 2017/0098162 A1 | 4/2017 | Ellenbogen et al. | |
| 2017/0098172 A1 | 4/2017 | Ellenbogen et al. | |
| 2017/0099200 A1 | 4/2017 | Ellenbogen et al. | |
| 2018/0137456 A1 * | 5/2018 | Fan | G06Q 10/087 |
| 2018/0260630 A1 | 9/2018 | Cao et al. | |
| 2018/0295327 A1 | 10/2018 | Yearwood et al. | |
| 2018/0350218 A1 | 12/2018 | Jeon et al. | |
| 2019/0011909 A1 | 1/2019 | Kerzner | |

OTHER PUBLICATIONS

Non-Final Office Action dated Apr. 30, 2019, issued in related U.S. Appl. No. 15/971,456 (36 pages).
Non-Final Office Action dated Dec. 2, 2019, issued in related U.S. Appl. No. 15/971,456 (35 pages).
U.S. Appl. No. 62/469,534, filed Mar. 10, 2017.
U.S. Appl. No. 15/914,360, filed Mar. 7, 2018.
Wang, Xinyu et al., "Robust and Real-Time Deep Tracking via Multi-Scale Domain Adaptation," arXiv:1701.00561v1 [cs.CV], Jan. 3, 2017.
Non-Final Office Action dated Sep. 10, 2019, issued in related U.S. Appl. No. 15/971,437 (31 pages).

* cited by examiner

SURVEILLANCE SYSTEM WITH INTELLIGENT ROBOTIC SURVEILLANCE DEVICE

CROSS REFERENCE TO RELATED APPLICATION

This application is a continuation application of U.S. Non-Provisional application Ser. No. 15/971,437, filed on May 4, 2018, which claims the benefit of priority to U.S. Provisional Application No. 62/505,090, filed on May 11, 2017, and entitled "SURVEILLANCE SYSTEM WITH INTELLIGENT CRUISING DEVICE." All of the above referenced applications are hereby incorporated by reference in their entirety.

TECHNICAL FIELD

The present invention relates to a surveillance system, and in particular, to a surveillance system with one or more intelligent robotic surveillance devices.

BACKGROUND

Surveillance systems, more specifically video surveillance systems, have been widely used in a variety of industries. Recent demands on accuracy and timeliness exposes several problems of existing surveillance systems. For example, existing surveillance systems only passively record a situation, but do not perform any analysis, let alone making a proper decision to respond to the situation. They heavily reply on security officers to analyze the situation and handle it properly. Some surveillance systems may have an ability to analyze a video of a situation based on computer vision techniques. However, the decision making process is still left to the security officers. If the security officers are not informed in time, for example, if the security offers are temporarily absent, away from the monitors of the systems, or just taking eyes off the monitor for a few minutes due to tiredness, then the whole surveillance systems are meaningless. Many urgent situations will be missed.

Further, existing surveillance systems are not flexible. Once installed, they cannot move. Some surveillance systems may have pan-tilt-zoom functions, but the positions of cameras are fixed. Even carefully designed, such systems may still have dead angles. This problem is getting worse where surrounding environment changes, while the surveillance systems cannot change accordingly. In addition to the problem of dead angle or the like, fixed cameras may have accuracy problem. For example, in face recognition, the algorithm usually has a maximum size and a minimum size limitation on a person in an image. However, when the person is approaching from a distance, which occurs frequently in real life, the size difference of the person in the image may be significant, exceeding the limitations of the face recognition algorithm and thus decreasing the accuracy in face recognition.

SUMMARY

According to one aspect of the present disclosure, a surveillance system may comprise: one or more computing devices and one or more robotic surveillance devices. The one or more computing devices may be configured to: obtain video data captured by one or more cameras; analyze the video data to determine whether there is any trigger event; in response to determining that there is a trigger event, determine an optimal robotic surveillance device among the one or more robotic surveillance devices based on the trigger event; and provide an instruction to the optimal robotic surveillance device. The optimal robotic surveillance device may be configured to perform a responding action in response to receiving the instruction.

In some embodiments, the trigger event includes a person identity, an activity, a combination of a person identity and an activity, or a non-human object. In some embodiments, determining an optimal robotic surveillance device may comprise: determining a desired location based on the trigger event; and determining, among the one or more robotic surveillance devices, the robotic surveillance device closest to the desired location as the optimal robotic surveillance device. In other embodiments, determining an optimal robotic surveillance device may comprise: determining a location of a security person through a user device with which the security person is equipped; and determining, among the one or more robotic surveillance devices, the robotic surveillance device closest to the security person as the optimal robotic surveillance device.

In some embodiments, the optimal robotic surveillance devices may be further configured to, in response to receiving the instruction, plan a traveling path to a desired location indicated by the trigger event. In some embodiments, the optimal robotic surveillance device may be further configured to predict a future location of a target indicated by the trigger event. The target may include a person. In some embodiments, the optimal robotic surveillance device may further configured to track the target.

In some embodiments, the responding action may comprise one or more of a video or picture recording, a voice alarming, sending a high intensity light, physical interference, carrying a person and interacting with a person. In some embodiments, the one or more robotic surveillance devices may be selected from one or more of the following devices: a motorized device, a drone, and a platform for transportation.

According to another aspect of the present disclosure, a surveillance method may comprise: obtaining video data; analyzing the video data to determine whether there is any trigger event; in response to determining that there is a trigger event, determining an optimal robotic surveillance device among one or more robotic surveillance devices based on the trigger event; and providing an instruction to the optimal robotic surveillance device, wherein the instruction includes performing a responding action. In some embodiments, the optimal robotic surveillance device performs the responding action in response to the instruction.

According to yet another aspect of the present disclosure, a robotic surveillance device may comprise: one or more processors; and a memory storing instructions. The instructions, when executed by the one or more processors, cause the robotic surveillance device to perform: obtaining video data captured by one or more cameras; analyzing the video data to determine whether there is any trigger event; in response to determining that there is a trigger event, determining an optimal robotic surveillance device among one or more robotic surveillance devices based on the trigger event; providing an instruction to the optimal robotic surveillance device; and in response to receiving the instruction, performing a responding action based on the instruction.

It is to be understood that both the foregoing general description and the following detailed description are exemplary and explanatory only, and are not restrictive of the invention.

BRIEF DESCRIPTION OF THE DRAWINGS

In order to illustrate the solutions of embodiments of the present disclosure more clearly, drawings used in connection with the embodiments will be briefly described below. It should be understood that the following drawings illustrate only certain embodiments of the present disclosure, and the scope of the present disclosure is not limited thereto.

DETAILED DESCRIPTION OF THE DRAWINGS

The present disclosure will now be described in further detail hereinafter with reference to the accompanying drawings, in which various exemplary embodiments are shown. This present disclosure may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
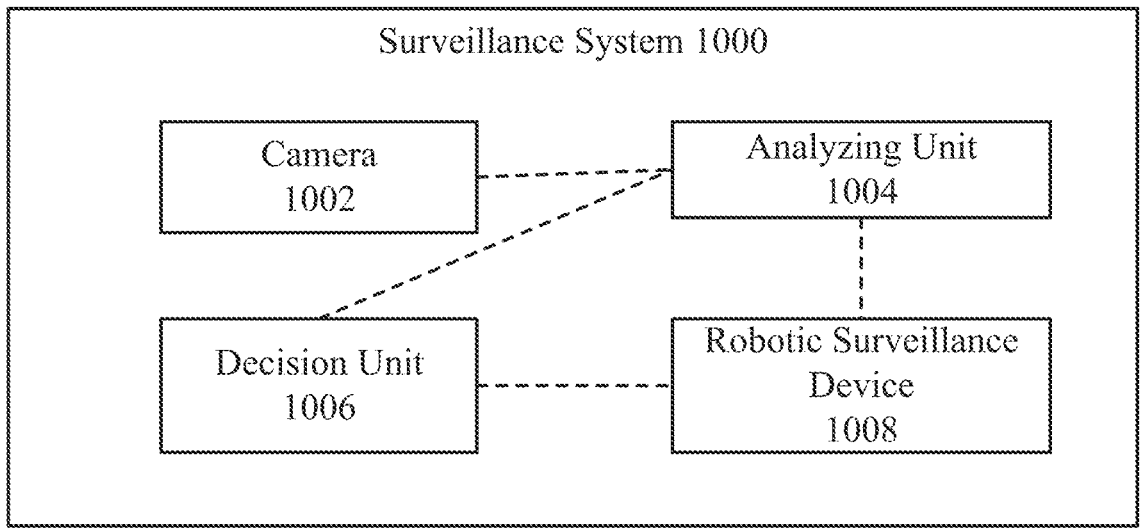
FIG. 1 illustrates an exemplary surveillance system according to some embodiments of the present disclosure.

FIG. 1 illustrates an exemplary surveillance system 1000 according to some embodiments of the present disclosure. In these embodiments, the surveillance system 1000 may be used for recognizing a specific person and/or identifying a person's specific behavior and for performing a responding action to the recognition of the person and to the identification of the behavior accordingly. As shown in FIG. 1, the surveillance system 1000 may include one or more cameras 1002, an analyzing unit 1004, a decision unit 1006, and one or more robotic surveillance devices 1008 (also conveniently referred to as a robotic surveillance device 1008). These components of the surveillance system 1000 may be communicative with one another and other devices via Wi-Fi, cable, or another communication channel.

The one or more cameras 1002 may be used for capturing video data. For example, the one or more cameras 1002 may capture and record human activities into video data. The one or more cameras 1002 may transmit the video data to one or more of the other components of the surveillance system 1000 via a communication channel. In some embodiments, the one or more cameras 1002 may be separate units of the surveillance system 1000. For example, the one or more cameras 1002 may be positioned at predetermined fixed locations. Alternatively, the one or more cameras 1002 may be embedded in the one or more robotic surveillance devices 1008, e.g., a drone or a motorized device. In yet other embodiments, the surveillance system 1000 may equip with multiple cameras distributed all over an area, while some of which are fixed at predetermined locations, others of which are embedded on the one or more robotic surveillance devices 1008 to provide a thorough coverage of the area.

The analyzing unit 1004 may be configured to analyze the video data captured by the one or more cameras 1002 and to detect a trigger event. The analyzing unit 1004 may be a separate unit of the surveillance system 1000. For example, the analyzing unit 1004 may be, or may reside on a computing device such as a smart phone, a person computer, a laptop, a tablet, a smart wearable device, etc. Alternatively, the analyzing unit 1004 may be embedded in the one or more robotic surveillance devices 1008. In some embodiments, without shown in FIG. 1, the analyzing unit 1004 may further include a receiving module, an analysis module and an output module. The receiving module may be configured to receive input video data from the one or more cameras 1002. The analysis module may be configured to analyze input video data to determine whether there is one or more trigger events. The output module may be configured to output a trigger event to the one or more robotic surveillance device 1008 and/or the decision unit 1006 when the trigger event has been determined.

In some embodiments, a trigger event may be a specific person's appearing in the video, or a person's specific behavior's occurring. In some embodiments, a trigger event may be a combination of the occurring of a specific person and the specific person's specific behavior. For example, when the analyzing unit 1004 identifies, in the video data, a specific person, such as a suspect in the wanted list of the policy, a trigger event may be determined. In another example, the analyzing unit 1004 may determine it is a trigger event that some person is sneaking around a room with a label saying "No entry." In yet another example, when the analyzing unit 1004 recognizes both a suspect and a suspicious activity of the suspect, the analyzing unit 1004 may detect there is a trigger event.

In some embodiments, the analyzing unit 1004 may utilize a face recognition algorithm to identify a person's identity. For example, the analyzing unit 1004 may utilize a face recognition algorithm that adopts the Viola-Jones framework. Other face recognition algorithms may also be suitable, and are not limited by embodiments of the present disclosure.

In some embodiments, the analyzing unit 1004 may use an activity recognition algorithm to recognize a person's behavior. For example, the analyzing unit 1004 may use an activity recognition algorithm that adopts a tree structure model such as the Hierarchy Pose Temporal Model (HPT) disclosed by U.S. Provisional Application No. 62/469,534 and also disclosed by U.S. patent application Ser. No. 15/914,360, filed with the United States Patent and Trademark Office on Mar. 7, 2018, and entitled "ACTIVITY RECOGNITION METHOD AND SYSTEM." Specifically, the HPT algorithm adopts a deep learning method and combines three levels of information including scene information, temporal information and human pose information to achieve better activity recognition. For example, scene information may include statistical scene features, which can be extracted based on the deep learning method. The temporal information may include temporal features obtained from certain extracted key frames of video data. The human pose information may include pose features which may be extracted from certain frames of video data. The obtained features may be combined to achieve a final result. Other activity recognition algorithms may also be suitable, and are not limited by embodiments of the present disclosure.

Based on the face recognition and activity recognition techniques, the detection of certain identities (or faces), or certain activities, or a combination the identity and the activity may form the semantics of certain trigger events. For example, computation results of the analyzing unit 1004 may be "a stranger" and "the person is approaching a safe box." Therefore, the combination of the computation results, i.e., "a stranger is approaching a safe box", may form the semantics of a trigger event. In some embodiments, a trigger event may be formed based on detection of other situations. For example, a trigger event may be formed based on detection of non-human objects such as automobiles and animals. The analyzing unit 1004 may use other detection algorithms, e.g., object detection algorithm, to detect a situation other than person identities and activities. The analyzing unit 1004 may therefore determine other trigger events under the different situations. Such algorithms and trigger events are not limited by embodiments of the present disclosure.

In some embodiments, a trigger event may trigger a responding action that may be performed by one or more of other components of the surveillance system 1000. For example, the analyzing unit 1004 may transmit data describing the determined trigger event to one or more of the other components of the surveillance system 1000 (such as the decision unit 1006, the one or more robotic surveillance devices 1008) to cause the one or more other components to perform a responding action.

The decision unit 1006 may be configured to coordinate one or more human persons (e.g., security officers) and the one or more robotic surveillance devices 1008. In some embodiments, the decision unit 1006 may be a separate unit of the surveillance system 1000 and communicate with the analyzing unit 1004, the one or more robotic surveillance devices 1008, and/or one or more human persons (equipped with user devices, e.g., mobile phones, smart watches, laptops, personal computers, tablets, a smart wearable device, or any other devices having communication functions) via a communication channel, such as Wi-Fi. Similar to the analyzing unit 1004, the decision unit 1006 may be, or may reside on a computing device such as a smart phone, a laptop, a person computer, a tablet, a smart wearable device, etc. Alternatively, the decision unit 1006 may be embedded in the one or more robotic surveillance devices 1008.

In some embodiments, upon receiving a trigger event from the analyzing unit 1004, the decision unit 1006 may determine, based on the trigger event, whether to inform a person such as a security officer or to instruct one or more robotic surveillance devices 1008 to go to a desired location and perform a responding action autonomously. In some embodiments, the decision unit 1006 may also determine whether it is appropriate to instruct both a security person and a robotic surveillance device 1008 to go the a desired location and perform a responding action.

A desired location may be a location indicated by the trigger event. For example, the trigger event may indicate a crime scene such as a person is stealing a laptop from a room. Therefore the room may be the desired location indicated by this trigger event. In some embodiments, upon receiving a trigger event, if the decision unit 1006 detects that a security person is close to a robotic surveillance device 1008 near the desired location indicated by the trigger event, e.g., a crime scene, the decision unit 1006 may inform the security person to control the robotic surveillance device 1008 and go to the location along with the robotic surveillance device 1008. On the other hand, if the decision unit 1006 detects that no security officer is close to any robotic surveillance device 1008 near the desired location indicated by the trigger event, the decision unit 1006 may instruct the robotic surveillance device 1008 to go to the location and perform the responding action autonomously.

For example, the decision unit 1006 detects all the geo-locations of the security officers and the robotic surveillance devices 1008 within a building or a flat area, covered by the surveillance system 1000, and determine if there is any security officer is close to a robotic surveillance device 1008, e.g., within a predetermined distance such as one meter, five meters, 10 meters, etc. The decision unit 1006 may also use the detected geolocations to determine if any security officer and/or any robotic surveillance device 1008 is near the location indicated by the trigger event, e.g., within a predetermined distance such as 50 meters, 100 meters, 200 meters, 500 meters, 1000 meters, etc. In other examples, a certain software application may be installed on the security officers' user devices and report their geolocations to the decision unit 1006. Similarly, the robotic surveillance devices 1008 may also report their geolocations to the decision unit 1006.

In some embodiments, the decision unit 1006 may determine an optimal robotic surveillance device 1008 that is the robotic surveillance device 1008 closest to the desired location indicated by the trigger event, among all robotic surveillance devices 1008 in the surveillance system 1000. For example, among all robotic surveillance devices within 500 meters to the desired location indicated by the trigger event, the decision unit 1006 further determine which is the closest robotic surveillance device 1008 and determine that the closest robotic surveillance device 1008 is the optimal robotic surveillance device 1008 to perform a responding action. In other embodiments, the decision unit 1006 may determine an optimal robotic surveillance device 1008 that is the robotic surveillance device 1008 closest to a security officer. For example, the decision unit 1006 may determine the location of an on-duty security officer through the user device with which the security officer is equipped and choose as an optimal robotic surveillance device 1008 the robotic surveillance device 1008 from all the robotic surveillance devices 1008 of the system 1000 that is closest to the security officer.

In some embodiments, the decision unit 1006 may inform the security person through the user device with which the person is equipped. In some embodiments, the decision unit 1006 may inform both the person and the robotic surveillance device 1008 to cooperate with each other and to perform a responding action. In other embodiments, the decision unit 1006 may instruct the robotic surveillance device 1008 to go pick up the security person nearby and carry the security person to the desired location indicated by the trigger event. In yet other embodiments, the decision unit 1006 may instruct the robotic surveillance device 1008 to go to the desired location indicated by the trigger event and perform a responding action autonomously.

In some embodiments, the decision unit 1006 may determine the reliability of the trigger event. The reliability of a trigger event may be a probability (e.g., a probability within the range of 0-1) that indicates the seriousness of the trigger event. For example, the larger the probability is, a more serious security issue may be indicated by the trigger event. For example, a trigger event of "two men are using some tool to unlock a door of a room" may have a higher reliability than a trigger event of "a man is approaching a locked room." In some embodiments, the decision unit 1006 may determine if the reliability of a trigger event is higher than a predetermined threshold, e.g., 0.5, 0.6, 0.8, etc. When the decision unit 1006 determines that the reliability of a trigger event is equal to or higher than the predetermined threshold, the decision unit 1006 may inform a security officer to go to the desired location indicated by the trigger event directly. When the decision unit 1006 determines that the reliability of a trigger event is lower than a predetermined threshold, the decision unit 1006 may instruct the robotic surveillance device 1008 that is closest to the desired location to go to the location and perform one or more responding actions. Other decisions may be made by the decision unit 1006 upon other scenarios, such decisions and scenarios are not limited by embodiments of the present disclosure.

The robotic surveillance device 1008 may be configured to receive the trigger event and the instructions and based on the trigger event and/or the instructions, to go to the desired location indicated by the trigger event and perform responding actions in response to the trigger event. The robotic surveillance device 1008 may include, but are not limited to, a motorized device, a drone, a wheel driven robot and a platform for transportation. Those skilled in the art may recognize that other types of devices may be also used as robotic surveillance device 1008.

Figure 2:
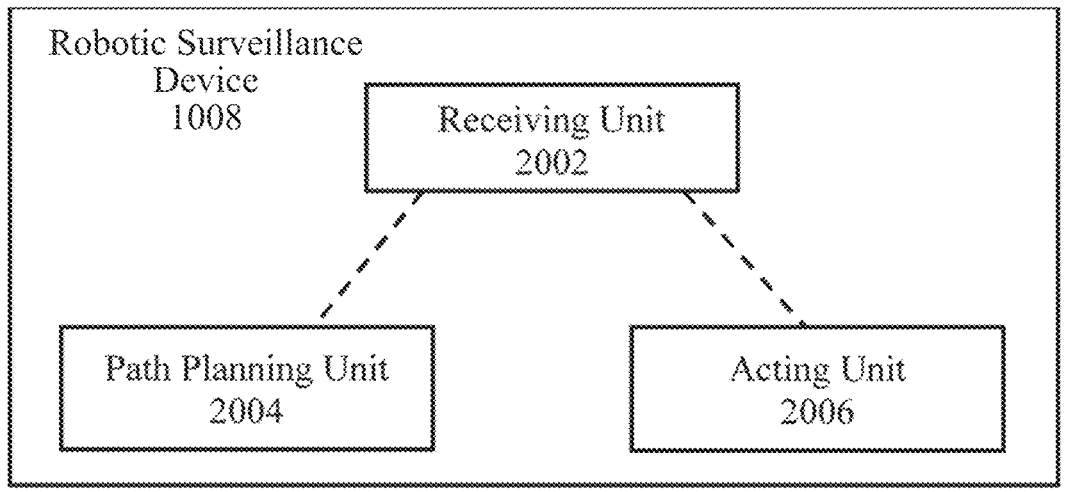
FIG. 2 illustrates components of an exemplary robotic surveillance device according to some embodiments of the present disclosure.

FIG. 2 illustrates components of the robotic surveillance device 1008 according to some embodiments of the present disclosure. In the embodiments of FIG. 2, the robotic surveillance device 1008 may include a receiving unit 2002, a path planning unit 2004 and an acting unit 2006. The receiving unit 2002 may be configured to receive the trigger event from the analyzing unit 1004 and to receive the instructions from the decision unit 1006.

The path planning unit 2004 may be configured to plan a path for the robotic surveillance device to go to the desired location. In some embodiments, the path planning unit 2004 may plan the path from the current location of the robotic surveillance device 1008 to the desired location according to various path planning methods. For example, the path planning unit 2004 may select a predetermined path as the traveling path of the robotic surveillance device 1008. The robotic surveillance device 1008 may go to the desired location along the selected predetermined path. In some embodiments, a plurality of predetermined paths may be pre-stored in the path planning unit 2004 or a database of the surveillance system 1000 (not shown) and the path planning unit 2004 may select the most suitable path based on predetermined criteria. For example, the path planning unit 2004 may select the shortest predetermined path from the current location to the desired location. Other criteria may also be appropriate, and is not limited by embodiments of the present disclosure.

In other embodiments, the path planning unit 2004 may calculate an optimal path from the present location to the desired location for the robotic surveillance device 1008 to travel along. For example, the path planning unit 2004 may build nodes based on a known map, and then calculate the optimal path using a path planning algorithm. The nodes of the map may be built using various methods. For example, the nodes may be built based on landmarks. Usually landmarks may be representative locations such as doors, tables, etc. In another example, the nodes may be built by gridding the map. For example, a map may be divided by n horizontal lines and n vertical lines, and each grid formed by the horizontal lines and the vertical lines may be built as a node. The map obtained through gridding may be referred to as an "occupancy grid map."

Further, the path planning unit 2004 may calculate the optimal path based on various path planning algorithms. For example, the path planning unit 2004 may use the Dijkstra's algorithm. The path planning unit 2004 may fix a single node as the "source" node or a starting point and find the shortest paths from the source node to all other nodes in the map. The node may also be referred to as a "point" or an "intersection," conveniently hereinafter. By applying the Dijkstra's algorithm, the path planning unit 2004 may assume that one would like to find the shortest path between two intersections on an occupancy grid map, referred to as a starting point and a destination. The path planning unit 2004 may initially assign to a starting point a tentative distance value of zero, and to each of the other intersections on the map a tentative distance value, e.g., infinity or a super large value, indicating that those intersections have not yet been visited by the algorithm. At each iteration, the path planning unit 2004 may select a current intersection. For the first iteration, the current intersection may be the starting point, and the distance to it may be zero. For the subsequent iterations, the current intersection may be the closest unvisited intersection to the starting point.

In some embodiments, the path planning unit 2004 may update the tentative distance value for each unvisited intersection. The path planning unit 2004 may calculate a distance from the current intersection to each unvisited intersection that is directly connected to it. The path planning unit 2004 may then compare the value of the distance and the previously assigned tentative value for each unvisited intersection. If the value of the distance is less than its previously assigned tentative value, the path planning unit 2004 may assign to the unvisited intersection the value of the distance. This way, the intersection may be relabeled with the shorter path if the path to it through the current intersection is shorter than the previously known path. After updating the tentative distance value of each neighboring intersection to the current intersection (e.g., the intersection that is directly connected to the current intersection), the path planning unit 2004 may mark the current intersection as visited, and select the unvisited intersection with the lowest distance value as the new current intersection. Nodes marked as visited may be labeled with the shortest path from the starting point to it and may not be revisited or returned to.

In some embodiments, the path planning unit 2004 may continue this process of updating the neighboring intersections with the shortest distances, marking the current intersection as visited and moving onto the closest unvisited intersection until the destination is marked as visited and the shortest path from the starting point to the destination may thus be determined.

In other embodiments, the path planning unit 2004 may use the Bellman-Ford algorithm. Similar to the Dijkstra's Algorithm, the Bellman-Ford algorithm is based on the principle of relaxation, where an approximation to the correct distance may be gradually replaced by more accurate values until the optimum solution is reached eventually. In both algorithms, the approximate distance to each vertex or node may always be an overestimate of the true distance, and may be replaced by the minimum of its old value and the length of a newly found path. The Bellman-Ford algorithm simply relaxes all the edges, and does this |V|−1 times, where |V| is the number of vertices or nodes in a graph such as a map. In each of these repetitions, the number of vertices with correctly calculated distances grows, eventually all vertices may have their correct distances.

In some embodiments, by applying the Bellman-Ford algorithm, the path planning unit 2004 may set a graph, e.g., a map, G(V, E), where V is the vertex set of G, and E is the edge set of G, an original point s, an array "Distance [n]," where n is the number of the vertices. The path planning unit 2004 may initialize the array Distance[n] as ∞ and Distant [s] as 0. The path planning unit 2004 may then record the length of the path from the original point s to a vertex i. Following operations may be executed for at most n −1 times. For each edge e(u, v), if Distant [u]+w(u, v)<Distant [v], then Distant [v]=Distant [u]+w(u, v), where w(u, v) is the weight of edge e(u, v). When such an operation does not update the numerical value of Distant [v], the loop may be ended because it may indicate that the shortest path has been found or some of the points are unreachable. Otherwise, the next cycle may be executed. Other path planning algorithms and methods may also be used, and are not limited by embodiments of the present disclosure.

The acting unit 2006 may be configured to conduct one or more responding actions in response to the trigger event. Under different circumstances, the acting unit 2006 of the robotic surveillance device 1008 may perform different actions based on the trigger event and/or the instructions. For example, if the analyzing unit 1004 sends a trigger event indicating that a fixed camera has a dead angle or is blocked by an item, the acting unit 2006 may determine to conduct active video recording.

Figure 3:
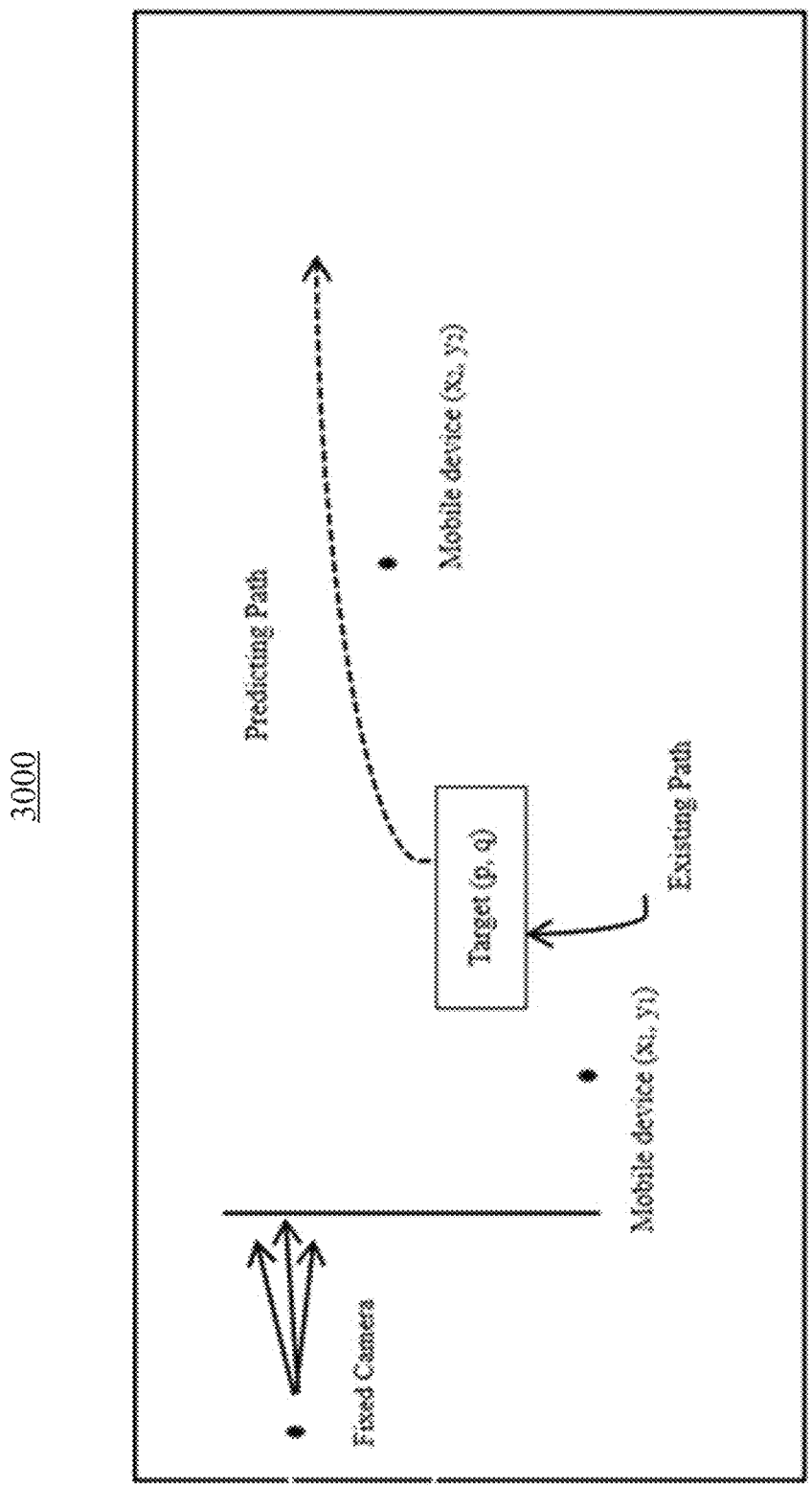
FIG. 3 illustrates a schematic diagram showing a scenario of a robotic surveillance device conducting active video recording according to some embodiments of the present disclosure.

FIG. 3 illustrates a schematic diagram 3000 showing a scenario of a robotic surveillance device 1008 conducting active video recording according to some embodiments of the present disclosure. As shown in FIG. 3, one or more robotic surveillance devices 1008, e.g., drones or mobile robots equipped with cameras, may go to various desired locations to perform video or picture recording according to different recording strategies. In some embodiments, one possible video or picture recording strategy may be peripheral recording where the robotic surveillance device 1008 may select a peripheral location and change its recording angle from the selected location towards the target indicated by the trigger event. For example, in FIG. 3, the location of the target is (p, q) and the selected location is (x1, y1), and the recording angle may be represented by the vector from (x1, y1) to (p, q).

In some embodiments, the video or picture recording strategy may be recording at a predicted location. According to this strategy, the robotic surveillance device 1008 may predict a possible future location of the target based on the trigger event, move to a location near the predicted location of the target, and perform the video or picture recording. For example, in FIG. 3, the current location of the target is (p, q), and the robotic surveillance device 1008 may predict that the target is likely to move to the location (x2, y2) within a short period of time. Therefore, the robotic surveillance device 1008 may travel to a location (not shown in FIG. 3) that is near the predicted location of the target and perform the recording within or after the time period.

Figure 4:
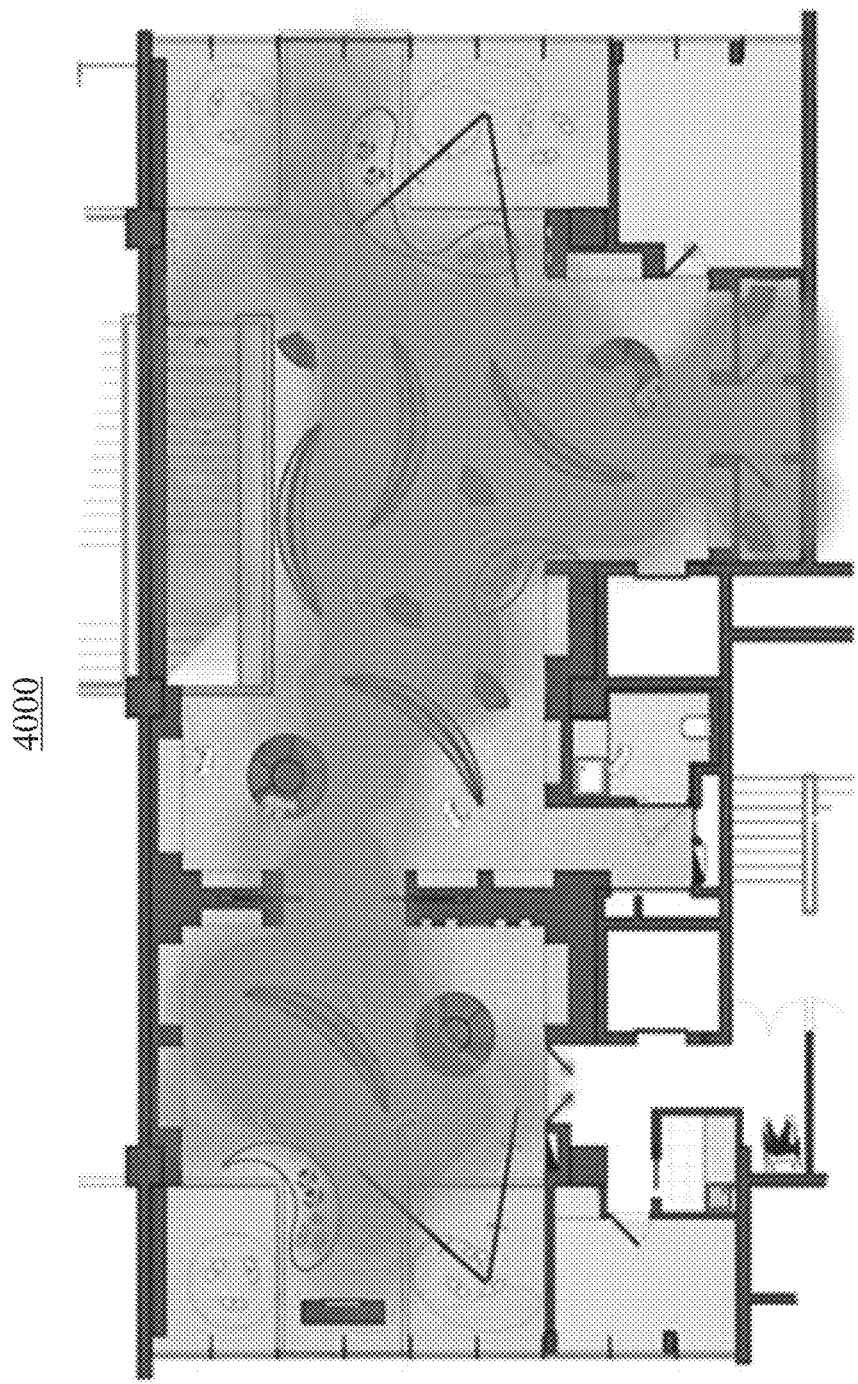
FIG. 4 illustrates an exemplary heat map used in location prediction according to some embodiments of the present disclosure.

The predicted location may be calculated according to different algorithms. In some embodiments, the predicted location may be calculated based on probability, where the robotic surveillance device 1008 may predict the regions where the target is most likely to show up by using a heat map. Specifically, some nodes in the map are more likely to be accessed than the others. Examples of such nodes include, but are not limited to, nodes near the door, the corridor connecting to halls, and the exit closest to the target. The robotic surveillance device 1008 may generate a heat map by defining the likelihoods of the nodes to be accessed. FIG. 4 illustrates an exemplary heat map 4000 used in location prediction according to some embodiments of the present disclosure. In FIG. 4, the likelihood or probability of being accessed for each node in the map may be represented by a degree of grey. A higher degree of grey may represent a higher likelihood.

In other embodiments, the predicted location may be calculated based on a previous trajectory of the target. According to this algorithm, if the previous trajectory curve of the target is known, the robotic surveillance device 1008 may predict a tendency of the curve by conducting a curve-fitting. The algorithm may further adopt the Kalman Filter, so that the result may be more accurate. This fine level prediction is more accurate since it estimates the actual tendency of a behavior, reducing prediction errors. In yet other embodiments, the above mentioned location predicting algorithms may be applied in combination. In addition, other algorithms may also be used, and are not limited by embodiments of the present disclosure.

In some embodiments, the robotic surveillance device 1008 may track the target indicated by the trigger event and perform continuous recording. In order to track the target, the robotic surveillance device 1008 may adopt a Multi-Scale Domain Adaptation Tracker (MSDAT) algorithm, described by "ROBUST AND REAL-TIME DEEP TRACKING VIA MULTI-SCALE DOMAIN ADAPTATION," 2017 IEEE International Conference on Multimedia and Expo (ICME), Hong Kong, Hong Kong, 2017, pp. 1338-1343, and therefore incorporated by reference in its entirety. For example, the robotic surveillance device 1008 may apply the MSDAT algorithm to transfer features for image classification to a visual tracking domain via convolutional channel reductions.

Figure 5:
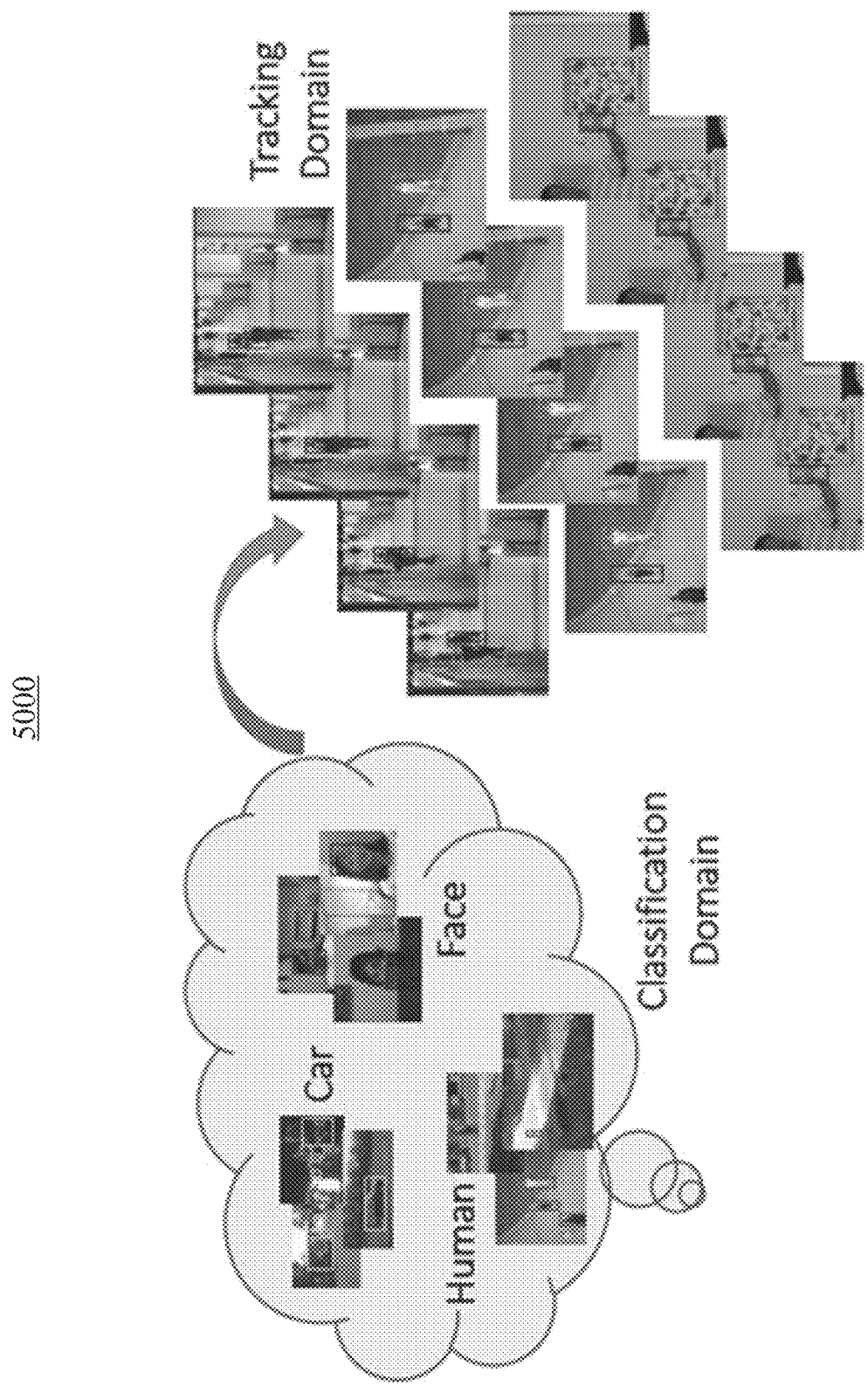
FIG. 5 illustrates a diagram showing an adaptation procedure of the Multi-Scale Domain Adaptation Tracker (MS-DAT) algorithm according to some embodiments of the present disclosure.

FIG. 5 illustrates a diagram showing an adaptation procedure 5000 of the Multi-Scale Domain Adaptation Tracker (MSDAT) algorithm according to some embodiments of the present disclosure. In FIG. 5, most of a deep neural network may be pre-trained for image classification, where the algorithm focus on object classes. The robotic surveillance device 1008 may apply the MSDAT algorithm to transfer the classification features to the visual tracking domain, where an individual object may be treated independently. Other recording strategies may also be used by the robotic surveillance device 1008, and are not limited by embodiments of the present disclosure.

With respect to other types of responding actions, in some embodiments, if the analyzing unit 1004 of the surveillance system 1000 has detected a trigger event that is a crime scene, the robotic surveillance device 1008 may determine to interfere with the crime upon arriving at the crime scene. For example, the robotic surveillance device 1008 may send a voice alarm via a loudspeaker equipped thereon when approaching the crime scene. The robotic surveillance device 1008 may also interrupt the on-going crime by sending high intensity light via a flashlight or a dazzler, or by physical interference. Moreover, the robotic surveillance device 1008 may determine to chase the criminal by using the tracking algorithm as mentioned above. Other possible actions may also be performed by the robotic surveillance device 1008, and are not limited by embodiments of the present disclosure.

In some embodiments, the robotic surveillance device 1008 may interact with a security officer when the decision unit 1006 has determined that the situation indicated by the trigger event needs a security officer to intervene. The robotic surveillance device 1008 may carry the security officer to the desired location. For example, the robotic surveillance device 1008 may include a manned platform (not shown in FIG. 2) for carrying a person during operation. Examples of the manned platform may include, but are not limited to, a bicycle, a motorcycle, a quadricycle, and any other suitable forms as long as it can provide the function of carrying a person. The battery and the payload of the manned platform are not limited to specific types, but may be selected by a person skilled in the art according to actual needs. However, it should be noted that the battery and the payload should at least be sufficient for carrying a human being with normal weight and normal height.

In some embodiments, the robotic surveillance device 1008 may further include a programmable operating system for managing computer hardware and software resources and for providing services for computer programs. Examples of the operating system may include, but are not limited to, Android operating system and Robot Operating System (ROS). ROS is a flexible framework for writing robot software. In some embodiments, the robotic surveillance device 1008 may also include hardware operating means for operating the hardware of the device directly. For example, if the robotic surveillance device 1008 is equipped with an Android system, Application Program Interfaces (APIs) or Software Development Kits (SDKs) may be provided for directly controlling related sensors or mobile components of the device 1008. In some embodiments, the robotic surveillance device 1008 may also include various types of sensors for facilitating its actions such as path planning. The sensors may include general purpose sensors such as laser sensors, Light Detection and Ranging (LIDAR) sensors, cameras, sonar sensors, etc. The sensors may also include special purposed sensors designed for specific uses, such as sensors used in Simultaneous Localization and Mapping (SLAM) technologies.

Figure 6:
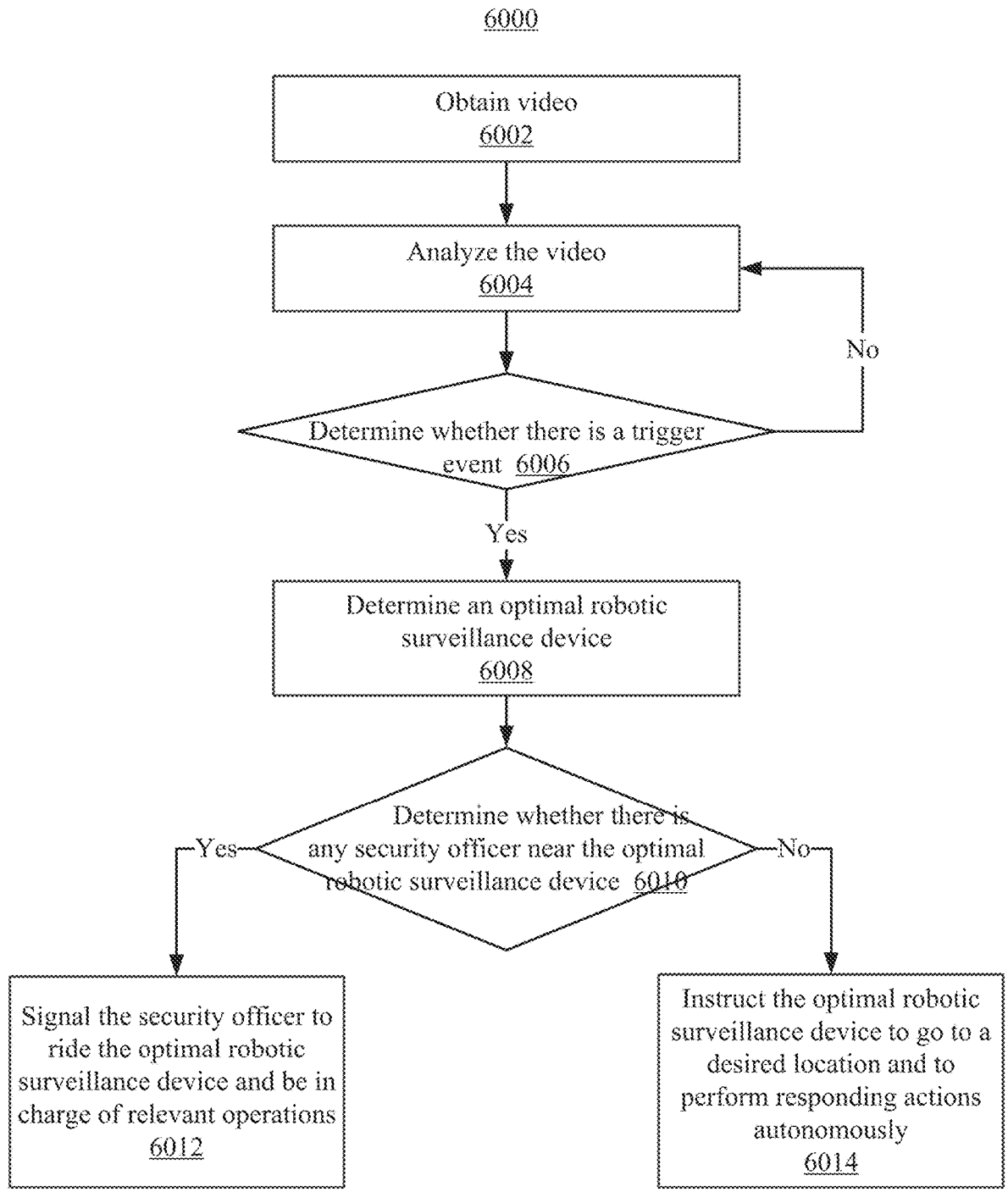
FIG. 6 illustrates a flow chart of an exemplary working process of the surveillance system in FIG. 1 according to some embodiments of the present disclosure.

FIG. 6 illustrates a flow chart of an exemplary working process 6000 of the surveillance system in FIG. 1 according to some embodiments of the present disclosure. In the illustrated embodiments, one or more of the robotic surveillance devices 1008 may include a manned platform, and the one or more robotic surveillance device 1008 may go to the desired location by itself or carrying a security officer.

At block 6002, the analyzing unit 1004 of the surveillance system 1000 may obtain video data. For example, video stream captured by the cameras may be imported into the analyzing unit 1004. At block 6004, the analyzing unit 1004 may analyze the video data. For example, the analyzing unit 1004 may analyze video clips using suitable identity recognition algorithm and activity recognition algorithm.

At block 6006, the analyzing unit 1004 may determine whether there is a trigger event based on the video data. For example, the analyze unit 1004 may use face recognition algorithm to determine the identity of a person occurring in the video and determine if the person is a suspect based on the person's identity. If so, there is a trigger event. In other examples, the analyzing unit 1004 may use activity recognition algorithm to detect a person's behavior to determine if the behavior is suspicious. If so, there is a trigger event. In yet other examples, the analyzing unit 1004 may combine the identity determination and activity determination to determine if there is a trigger event.

If the analyzing unit 1004 determines that there is no trigger event, the working process 6000 returns to block 6004, and the analyzing unit 1004 may continue to analyze more video data. If the analyzing unit 1004 determines that there is a trigger event, the working process 6000 goes to block 6008 and at block 6008 the decision device 1006 of the surveillance system 1000 may determine an optimal robotic surveillance device 1008. An optimal robotic surveillance device 1008 may be the robotic surveillance device 1008 closest to a desired location indicted by the trigger event. The decision device 1006 of the surveillance system 1000 may connect to the optimal robotic surveillance device 1008 via a communication channel, e.g., Wi-Fi.

At block 6010, the decision unit 1006 of the surveillance system 1000 may determine whether there is any security officer near the optimal robotic surveillance device 1008. For example, the decision unit 1006 may detect locations of security officers through the user devices with which the security officers are equipped. If the decision unit 1006 determines that there is an security officer near the optimal robotic surveillance device 1008, the process 6000 goes to block 6012; otherwise, it goes to block 6014.

At block 6012, the decision unit 1006 of the surveillance system 1000 may signal the security officer near the optimal robotic surveillance device 1008 to go to the desired location by riding the optimal robotic surveillance device 1008, and the security officer may be in charge of relevant operations.

At block 6014, the decision unit 1006 of the surveillance system 1000 may instruct the optimal robotic surveillance device 1008 to go to the desired location and perform responding actions autonomously. For example, upon receiving the instruction, the optimal robotic surveillance device 1008 may plan its own path and determine to conduct the responding actions such as video or picture recording or other interference strategies autonomously.

Figure 7:
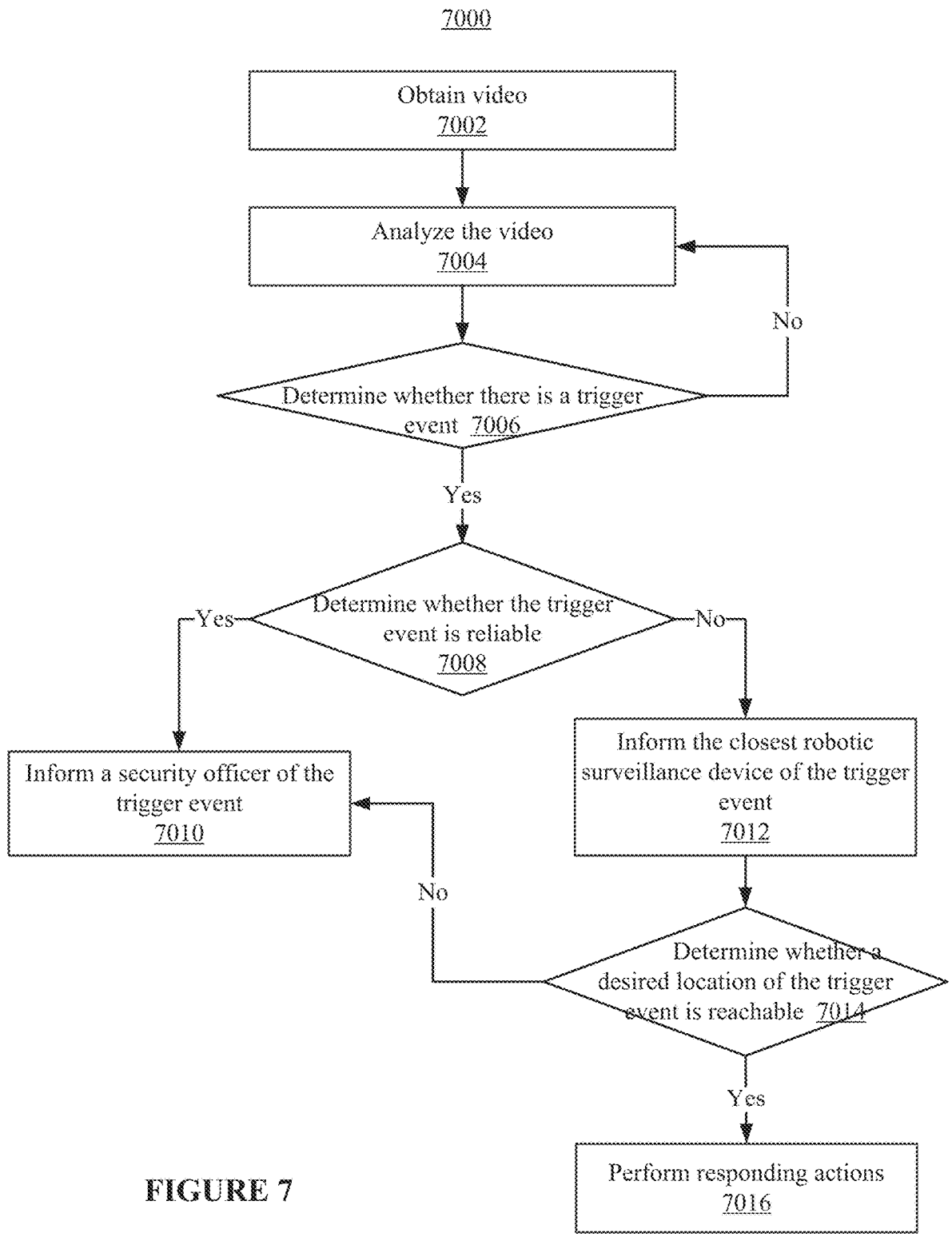
FIG. 7 illustrates another exemplary working process of the surveillance system in FIG. 1 according to some embodiments of the present disclosure.

FIG. 7 illustrates another exemplary working process 7000 of the surveillance system 1000 in FIG. 1 according to some embodiments of the present disclosure. Similar to process 6000 illustrated in FIG. 6, at block 7002, the analyzing unit 1004 of the surveillance system 1000 may obtain video data. At block 7004, the analyzing unit 1004 may analyze the video data. For example, the analyzing unit 1004 may analyze video clips using suitable identity recognition algorithm and activity recognition algorithm. At block 7006, the analyzing unit 1004 may determine whether there is a trigger event based on the video data. If so, then the process 7000 goes to block 7008; otherwise, then the process 7000 returns to block 7004.

At block 7008, the decision unit 1006 may determine whether the trigger event if reliable. For example, the decision unit 1006 may determine the reliability of the trigger event and determine if the reliability is higher than a predetermined threshold. The reliability of a trigger event may be a probability (e.g., a probability within the range of 0-1) that indicates the seriousness of the trigger event. If the reliability of the trigger event is higher than the threshold, then the decision unit 1006 may determine that the trigger event is reliable.

If the decision unit 1006 determines that the trigger event is reliable, the process 7000 goes to block 7010. At block 7010, the decision unit 1006 may inform a security officer of the trigger event. The security officer may go to the desired location indicated by the trigger event directly. If the decision unit 1006 determines that the trigger event is not reliable, the process 7000 goes to block 7012. For example, the decision unit 1006 may determine the seriousness of the trigger event is not higher than the threshold.

At block 7012, the decision unit 1006 may inform the robotic surveillance device 1008 that is closest to the desired location of the trigger event. At block 7014, the closest robotic surveillance device 1008 may calculate whether the desired location of the trigger event is reachable. For example, the closest robotic surveillance device 1008 may determine if there is an feasible path leading it to the desired location. If the closest robotic surveillance device 1008 determines that the desired location is reachable, the robotic surveillance device 1008 may plan its own path and perform video or picture recording according to suitable recording strategies, as described at block 7016. Otherwise, the robotic surveillance device 1008 may inform a security officer to go to the desired location, as described at block 7010.

Although the above-mentioned surveillance system is used for human detection and surveillance, the present discloser is not limited thereto, but can be applied to detect general objects, such as automobiles or animals. Further, those skilled in the art may understand and implement other variations to the disclosed embodiments from a study of the drawings, the present application, and the appended claims.

In the claims, the word "comprising" does not exclude other elements or steps, and the indefinite article "a" or "an" does not exclude a plurality. In applications according to present application, one element may perform functions of several technical features recited in claims. Any reference signs in the claims should not be construed as limiting the scope.

What is claimed is:

1. A surveillance system, comprising one or more computing devices and one or more robotic surveillance devices, wherein:
   the one or more computing devices are configured to:
      obtain video data captured by one or more cameras;
      analyze the video data to determine whether there is any trigger event;
      determine, in response to a trigger event, a desired location based on the trigger event, and validate whether the trigger event is reliable;
      determine a selected robotic surveillance device among the one or more robotic surveillance devices that is closest to the desired location;
      determine whether there is a security officer close to the selected robotic surveillance device;
      in response to determining the security officer close to the selected robotic surveillance device, instruct the security officer to go to the desired location by riding the selected robotic surveillance device; and
      in response to determining that the trigger event is not reliable,
         determine whether the desired location is reachable by the selected robotic surveillance device, and
         direct, in response to determining that the desired location is reachable, the selected robotic surveillance to plan a path to reach the desired location and perform a responding action at the desired location,
   wherein the selected robotic surveillance device is further configured to track a person by a Multi-Scale Domain Adaptation Tracker (MSDAT) algorithm, wherein the MSDAT algorithm transfers features for image classification to a visual tracking domain via convolutional channel reduction, and
   the selected robotic surveillance device is further configured to calculate a predicted location of the person indicated by the trigger event at a preset time, and move to and wait near the predicted location and perform the responding action at the preset time.

2. The surveillance system of claim 1, wherein the trigger event includes a person identity, an activity, a combination of a person identity and an activity, or a non-human object.

3. The surveillance system of claim 1, wherein the responding action comprises one or more of a video recording, a picture recording, a voice alarming, sending a high intensity light, a physical interference, carrying a person, or interacting with a person.

4. The surveillance system of claim 3, wherein the responding action is the video recording, and wherein the selected robotic surveillance device is configured to select a peripheral location and change a recording angle from the peripheral location towards the person.

5. The surveillance system of claim 3, wherein the responding action is the video recording.

6. The surveillance system of claim 5, wherein the predicted location is calculated based on a probability using a heat map.

7. The surveillance system of claim 5, wherein the predicted location is calculated based on a previous trajectory of the person.

8. The surveillance system of claim 1, wherein the one or more robotic surveillance devices each include one or more of a laser sensor, a LIDAR sensor, a camera, and a sonar sensor.

9. A surveillance method, comprising:
   obtaining, by one or more computing devices, video data captured by one or more cameras;
   analyzing, by the one or more computing devices, the video data to determine whether there is any trigger event;
   determining, in response to a trigger event, a desired location based on the trigger event, and validating whether the trigger event is reliable;
   determining a selected robotic surveillance device among one or more robotic surveillance devices that is closest to the desired location;
   determining whether there is a security officer close to the selected robotic surveillance device;
   in response to determining that there is the security officer close to the selected robotic surveillance device, instructing the security officer to go to the desired location by riding the selected robotic surveillance device; and
   in response to determining that the trigger event is not reliable,
      determining whether the desired location is reachable by the selected robotic surveillance device, and
      directing, in response to determining that the desired location is reachable, the selected robotic surveillance to plan a path to reach the desired location and perform a responding action at the desired location,
   wherein the selected robotic surveillance device is further configured to track a person by a Multi-Scale Domain Adaptation Tracker (MSDAT) algorithm, wherein the MSDAT algorithm transfers features for image classification to a visual tracking domain via convolutional channel reduction, and
   the selected robotic surveillance device is configured to calculate a predicted location of the person indicated by the trigger event at a preset time, and move to and wait near the predicted location and perform the responding action at the preset time.

10. The surveillance method of claim 9, wherein the trigger event includes a person identity, an activity, a combination of a person identity and an activity, or a non-human object.

11. The surveillance method of claim 9, wherein the responding action comprises one or more of a video recording, a picture recording, a voice alarming, sending a high intensity light, a physical interference, carrying a person, or interacting with a person.

12. The surveillance method of claim 11, wherein the responding action is the video recording, and wherein the selected robotic surveillance device is configured to select a peripheral location and change a recording angle from the peripheral location towards the person.

13. The surveillance method of claim 11, wherein the responding action is the video recording.

14. A robotic surveillance device, comprising:
one or more processors; and
a non-transitory memory storing instructions that, upon being executed by the one or more processors, cause the robotic device to perform operations, comprising:
obtaining video data captured by one or more cameras;
analyzing the video data to determine whether there is any trigger event;
determining, in response to a trigger event, a desired location based on the trigger event, and validating whether the trigger event is reliable;
determining a selected robotic surveillance device among one or more robotic surveillance devices that is closest to the desired location;
determining whether there is a security officer close to the selected robotic surveillance device;
in response to determining that there is the security officer close to the selected robotic surveillance device, instructing the security officer to go to the desired location by riding the selected robotic surveillance device; and
in response to determining that the trigger event is not reliable,
determining whether the desired location is reachable by the selected robotic surveillance device, and
directing, in response to determining that the desired location is reachable, the selected robotic surveillance to plan a path to reach the desired location and perform a responding action at the desired location,
wherein the selected robotic surveillance device is further configured to track a person by a Multi-Scale Domain Adaptation Tracker (MSDAT) algorithm, wherein the MSDAT algorithm transfers features for image classification to a visual tracking domain via convolutional channel reduction, and
the selected robotic surveillance device is further configured to calculate a predicted location of the person indicated by the trigger event at a preset time, and move to and wait near the predicted location and perform the responding action at the preset time.

15. The surveillance device of claim 14, wherein the trigger event includes a person identity, an activity, a combination of a person identity and an activity, or a non-human object.

\* \* \* \* \*